United States Patent [19]

Rice

[11] 4,111,041
[45] Sep. 5, 1978

[54] INDICATED MEAN-EFFECTIVE PRESSURE INSTRUMENT

[75] Inventor: William J. Rice, Elyria, Ohio

[73] Assignee: The United States of America as represented by the Administrator of the National Aeronautics and Space Administration, Washington, D.C.

[21] Appl. No.: 837,796

[22] Filed: Sep. 29, 1977

[51] Int. Cl.² ............................................. G01M 15/00
[52] U.S. Cl. ....................................................... 73/115
[58] Field of Search ...................... 73/115, 116, 117.2, 73/117.3

[56] References Cited

U.S. PATENT DOCUMENTS

| | | | |
|---|---|---|---|
| 2,800,014 | 7/1957 | Welch et al. | 73/116 |
| 2,817,966 | 12/1957 | Wright et al. | 73/116 |
| 3,283,569 | 11/1966 | King et al. | 73/115 |
| 3,815,410 | 6/1974 | Brown et al. | 73/115 |

*Primary Examiner*—Anthony V. Ciarlante
*Attorney, Agent, or Firm*—J. A. Mackin; J. R. Manning; N. T. Musial

[57] ABSTRACT

There is disclosed an apparatus for measuring indicated mean effective pressure (IMEP) of an internal combustion piston or rotary engine or of an external combustion engine such as a stirling engine. An optical shaft encoder measures crankshaft angle of the engine. Changes in volume with respect to changes in crankangle of one or more cylinders ($dV/d\theta$) is determined either empirically or algebraically from engine geometry and stored in a memory. As the crank angle changes, $dV/d\theta$ is read from the memory and multiplied by chamber or cylinder pressure. The product ($P\ dV/d\theta$) is then added to the total previously accumulated in the cycle. Each time $\theta$ changes by an amount equal to delta $\theta$, the process is repeated. At the end of each engine cycle, the total is equal to the IMEP value for that cycle.

12 Claims, 2 Drawing Figures

INDICATED MEAN-EFFECTIVE PRESSURE INSTRUMENT

ORIGIN OF THE INVENTION

This invention was made by an employee of the U.S. Government and may be manufactured or used by or for the Government without the payment of any royalties thereon or therefor.

BACKGROUND OF THE INVENTION

1. Field of the Invention

This invention relates to a method and apparatus for determining the work output of a rotary or piston, external or inernal combustion engine and is directed more particularly to a method and apparatus for multiplying cylinder pressure by changes in the volume of the cylinder with respect to changes in angle of the crankshaft.

2. Description of the Prior Art

One of the earliest methods of measuring IMEP was by directly recording on paper a pressure-volume (P-V) diagram by using various mechanical linkages which connect a recording pen to a piston of the engine and pressure measuring devices. The resulting P-V diagram was then cut out and the enclosed area determined. Later developments included the use of mechanical planimeters for measuring this area, the development of electronic volume transducers, the use of oscilloscope to display the P-V diagram in real time, and the use of cameras to record the P-V diagram for analysis. More recently, high speed digital recorders and computor analysis have been utilized.

Despite the sophistication of such recorders and computers, all the prior art methods involve post-run data reduction to determine the work output of an engine. With the present day research programs on engine efficiency, fuel economy, pollutant reduction and overall performance analysis there is a need for a method and apparatus to measure the IMEP of an engine in real time. Prior art patents for measuring IMEP include those such as U.S. Pat. No. 3,283,569 to King et al. The instrument disclosed uses the parameter $dV/dt$ in its computation and measures only average IMEP. The measured value is an approximation, being limited to the fundamental plus the second harmonic. A separate volume transducer and $dV/dt$ transducer are required for each cylinder in order to do simultaneous studies of IMEP for more than one cylinder.

U.S. Pat. No. 3,815,410 to William L. Brown, Jr. et al discloses apparatus for measuring IMEP by utilizing $dV/dt$ which would introduce a phase error related to RPM. The phase correction provided is valid only at one frequency and one RPM and only if the volume signal is a pure sinusoid.

OBJECTS AND SUMMARY OF THE INVENTION

It is an object of the invention to provide a method and apparatus for measuring IMEP of a piston or rotary, internal or external combustion engine without involving any time-dependent variables.

It is another object of the invention to provide a method and apparatus for measuring IMEP of multicylinder or multichamber engines without requiring a plurality to volume transducers.

Still another object of the invention is to provide a method and apparatus which indicates IMEP at the end of each cycle whereby a standard deviation of work output may be determined.

A further object of the invention is to provide a method and apparatus for measuring IMEP in real time over a complete cycle of operation.

An additional object of the invention is to provide a method and apparatus for measuring the IMEP of a piston engine without requiring post-run date reduction.

In summary, the invention involves a method and apparatus for measuring chamber or cylinder pressure and multiplying this value times changes in chamber or cylinder volume with respect to changes in crank angles. The product obtained for each change in crank angle is added to the previous product to provide a total at the end of each cycle. The cycle is then repeated.

DESCRIPTION OF A PREFERRED EMBODIMENT

The instant invention is based on the ability to calculate IMEP by substitution of variables as:

$$\oint_V P \cdot dV = \int_{\theta = o}^{4\pi} P \cdot \frac{dV}{d\theta} \cdot d\theta$$

where $\theta$ equals engine crank angle.

In this form the function $dVd\theta$ can be determined algebraically from the engine geometry and does not have to be calculated in real time.

The instrument approximates the continuous integral by the summation:

$$\sum_{n=O}^{1023} P \cdot \frac{dV}{d\theta} \bigg|_{\theta = n\Delta\theta} \cdot \Delta\theta \quad \text{where: } \Delta\theta = \frac{4\pi}{1024} \text{ rad}$$

Since $dV/d\theta$ can be determined algebraically or empirically as a function of $\theta$, it can be stored in a memory. The IMEP can then be determined by measuring $\theta$, obtaning the correct value of $dV/d\theta$ from the stored information, and multiplying this value by the instantaneous cylinder pressure and then summing each of the values obtained for each predetermined change in crank angle.

Although the instrument is intended to approximate the integral:

$$\int_{\theta = o}^{\theta} P \cdot \frac{dV}{d\theta} \cdot d\theta$$

it can generally compute the integral:

$$\int_{x = x_o}^{x} Y(t) \cdot F[x(t)] \cdot dx$$

where F is any single-valued function of $x$.

The invention can be used for internal or external combustion engines including piston types and rotary types. Where reference is made to varying volume chambers in the specification, piston type engines as well as rotary types are intended to be included.

Figure 1:
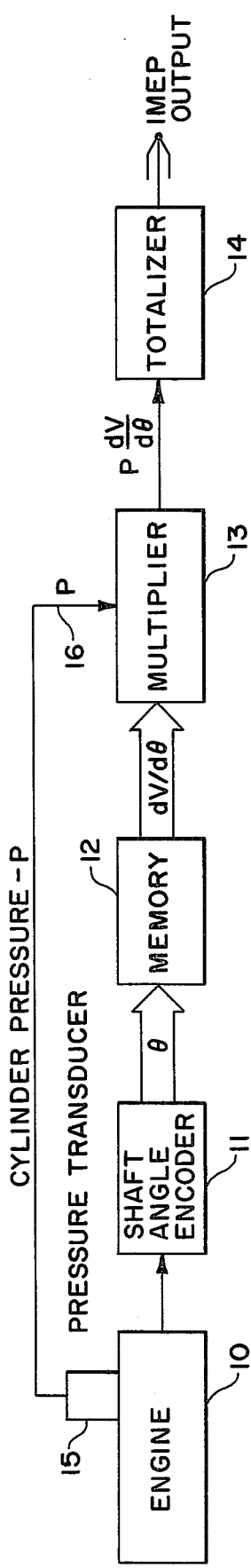
FIG. 1 is a functional block diagram of apparatus embodying the invention.

Referring now to FIG. 1, there is shown a functional block diagram including a piston engine 10, a shaft angle encoder 11, a memory 12, a multiplier 13 and a totalizer 14. A pressure transducer 15 measures the pressure in the cylinder of the engine and provides an electrical signal representative of pressure to multiplier 16.

The shaft angle encoder 11 supplies to memory 12 a signal representing specific values of crank angle $\theta$. Since any change in chamber or cylinder volume $dV$ for any specific value of crank angle $\theta$ was previously determined and stored in memory 11, the output of memory 12 supplied to multiplier 13 is $dV/d\theta$. The instantaneous cylinder pressure from pressure transducer 15 is multiplied in multiplier 13 by $dV/d\theta$. The output of the multiplier 13 for each particular value of crank angle $\theta$ is fed to a totalizer 14 where all the values for the $\theta$s are added over one cycle to produce an IMEP output.

Figure 2:
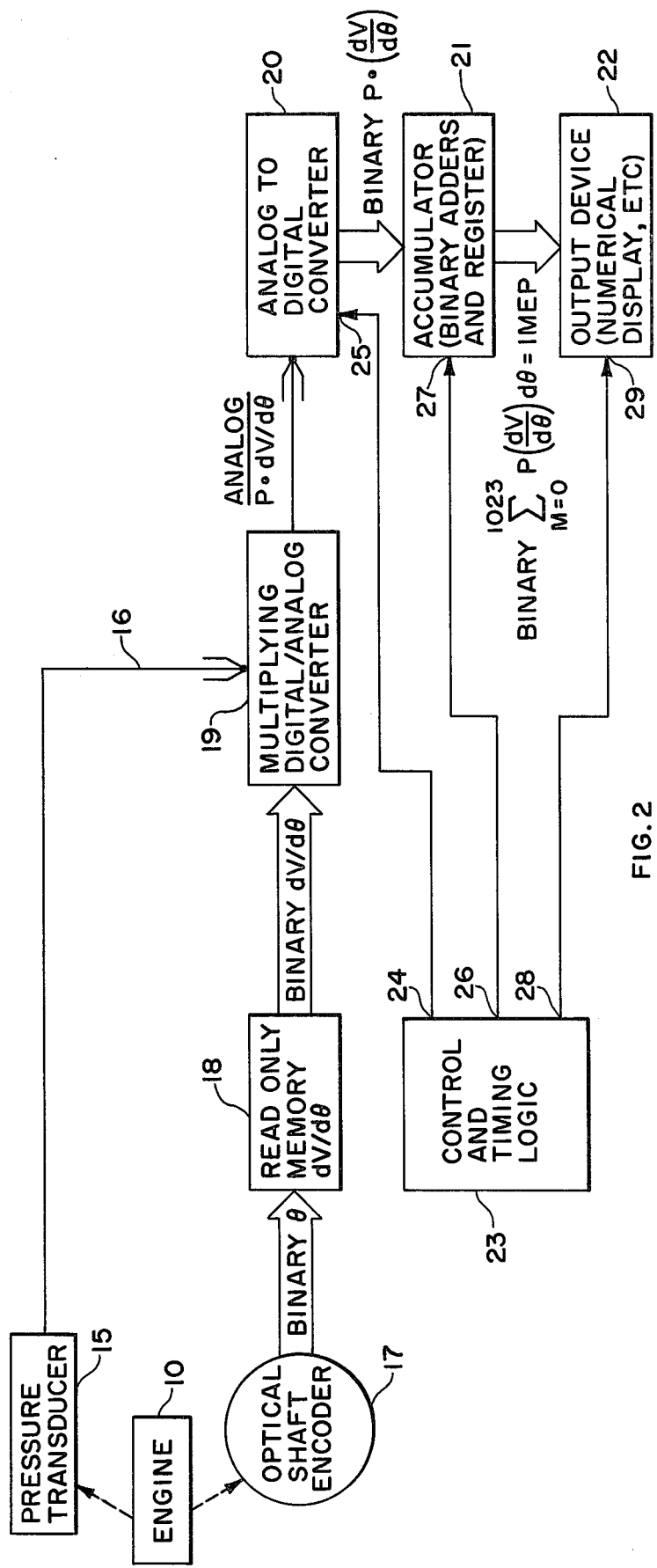
FIG. 2 is a detailed block diagram of the invention as used for measuring IMEP of a piston engine.

Referring now to FIG. 2, there is shown a more detailed block diagram of instrumentation embodying the invention. The crank shaft of engine 10 drives an optical shaft encoder 17 which provides a 10-bit binary code representing shaft angle in (720/1024) degree increments to a read-only memory 18. Encoder 17 may be a model 30HDAE made by RENCO Inc. or its equivalent. The $dV/d\theta$ function is stored in the preprogrammed read-only memory. The binary encoded crank angle from the optical shaft encoder 17 is used as the address to the memory.

The output of memory 18 is a binary digital value of $dV/d\theta$ for a particular value of $\theta$ and is directed to a multiplying digital/analog converter 19. A signal representing instantaneous pressure in the cylinder as measured by transducer 15 is also directed to multiplier 19 as shown by line 16 where it is multiplied by the output of memory 18. The output of multiplier 19 is an analog signal proportional to $P \cdot dV/d\theta$. This signal is directed to an analog-to-digital converter 20 where it is converted to its digital binary value. This process is repeated 1024 times during each engine cycle. The output of the accumulator is fed to any suitable output device such as a numerical display.

In order to convert the analog input signal of converter 20 to a digital signal for output to accumulator 21, time impulses are provided from a control and timing logic circuit 23. These pulses are provided from an output 24 of the logic circuitry to a control input 25 of converter 20. Similarly, control pulses must be provided to accumulator 21 and output device 22. Signals from outputs 26 and 28 of control and timing logic circuit 23 are provided to control inputs 27 and 29, respectively, of accumulator 21 and output device 22.

The signals supplied to inputs 27 and 29 of accumulator 21 and output device 22, respectively, include an 11th bit from the outputs 26 and 28 of the control and logic circuit 23. This 11th bit causes the accumulator 21 and the output device 22 to begin a new cycle.

The apparatus shown in FIG. 2 represents a hybrid digital-analog approach. However, the circuit could be completely analog or completely digital of desired. For example, analog function generators could be used to generate $dV/d\theta$ or a digital multiplier could be used if the pressure signal from pressure transducer 15 were digitized.

It will be understood that changes and modifications may be made to the above-described method and circuitry without departing from the spirit and scope of the invention as set forth in the claims appended hereto.

What is claimed is:

1. Apparatus for measuring the indicated mean effective pressure IMEP of an engine of the type having at least one varying volume chamber and a crankshaft comprising:

shaft angle encoder means for generating a signal for each angle $\theta$ of crankshaft rotation;

memory means for storing a $dV/d\theta$ value for each specific $\theta$ and for providing an output $dV/d\theta$ for each $\theta$ measured by said shaft angle encoder means where V is the chamber volume;

transducer means for providing a signal representative of instantaneous pressure in said chamber;

multiplier means for multiplying the chamber pressure P by $dV/d\theta$ for each $\theta$ measured by said shaft angle encoder means; and means for adding the products out of said mutltiplier means for each $\theta$ taking all increments of $\theta$ over one complete cycle of engine operation to yield IMEP.

2. The apparatus of claim 2 wherein said shaft angle encoder means provides a binary 10-bit output for each $\theta$, said memory means providing a binary representation of $dV/d\theta$ to said multiplying means for each value of $\theta$.

3. The apparatus of claim 2 wherein said multiplying means is a multiplying digital-to-analog converter and further including an analog-to-digital converter to digitize the analog output of said multiplier, an accumulator to add the digitized outputs of said analog-to-digital converter; and control means for causing said accumulator to start adding at the beginning of each engine cycle and to stop adding at the end of each engine cycle whereby the output of said accumulator is the IMEP of the engine.

4. The apparatus of claim 3 and including a device for displaying IMEP and means for causing said display means to display a representation of IMEP for a complete engine cycle.

5. The apparatus of claim 1 and including a device for displaying IMEP and means for causing said display means to display IMEP for each complete engine cycle.

6. The apparatus of claim 1 wherein said shaft angle encoder supplies an analog of $\theta$ to said memory, the output of the memory being an analog of $dV/d\theta$, the signal from said pressure transducer to said multiplier being in digital form.

7. The apparatus of claim 6 and including an accumulator which accepts digital input from said multiplier and yields an IMEP output and control means causing said accumulator to begin adding the input from said multiplier at the beginning of each engine cycle and to stop and reset at the end of each engine cycle.

8. The apparatus of claim 7 and including means for displaying the IMEP of each engine cycle.

9. The apparatus of claim 1 wherein said shaft angle encoder is an optical type.

10. The apparatus of claim 1 wherein said shaft angle encoder is of the incremental type providing a signal pulse for each predetemined change in crank angle $\theta$ and including a digital binary counter means which receives pulses from said shaft angle encoder and converts them to a digital signal which is directed to said memory.

11. The apparatus of claim 10 wherein said pressure transducer provides a digital signal to said multiplier and wherein said means for adding is an accumulator which provides an IMEP output, said apparatus including means for causing said accumulator to begin adding the signals from said multiplier at the beginning of each engine cycle and to stop at the end of each cycle and begin adding the $\theta$ signals for the next cycle.

12. A method of generating a signal representing the indicated mean effective pressure IMEP over at least one cycle of operation of an engine having at least one varying volume chamber and a crankshaft and corresponding to the integral:

$$\int_{\theta=o}^{\theta} P \cdot \frac{dV}{d\theta} \cdot d\theta$$

where $\theta$ is the crankshaft angle, P is the chamber pressure and V is the chamber volume comprising the steps of:
  determining $dV$ of said chamber for each specific $\theta$ of crankshaft rotation;
  storing the $dV/d\theta$s in a memory;
  providing to said memory a signal representing each $\theta$ of a cycle of operation to generate a signal $dV/d\theta$ for each $\theta$ signal;
  providing a signal P representative of instantaneous pressure in said chamber;
  multiplying P by $dV/d\theta$ for each $\theta$; and
  adding the products obtained for each $\theta$ over at least one cycle of operation.

* * * * *